United States Patent [19]
Patterson et al.

[11] Patent Number: 5,915,246
[45] Date of Patent: Jun. 22, 1999

[54] SELF-SERVICE SYSTEM

[75] Inventors: David Patterson; Michael G. Coutts, both of Dundee, United Kingdom

[73] Assignee: NCR Corporation, Dayton, Ohio

[21] Appl. No.: 08/787,415

[22] Filed: Jan. 22, 1997

[30] Foreign Application Priority Data

Aug. 30, 1996 [GB] United Kingdom .................. 9618110

[51] Int. Cl.⁶ .................................................. G06F 17/60
[52] U.S. Cl. ................................ 705/43; 705/10; 705/14; 705/35; 705/44
[58] Field of Search ................................ 705/43, 35, 39, 705/42, 44, 8, 10, 14

[56] References Cited

U.S. PATENT DOCUMENTS

| | | | |
|---|---|---|---|
| 4,700,295 | 10/1987 | Katsof et al. ............................. | 705/10 |
| 5,220,501 | 6/1993 | Lawlor et al. ............................ | 380/24 |
| 5,237,620 | 8/1993 | Deaton et al. ............................ | 705/10 |
| 5,389,773 | 2/1995 | Coutts et al. ............................ | 705/43 |
| 5,482,139 | 1/1996 | Rivalto .................................... | 186/36 |
| 5,557,513 | 9/1996 | Frey et al. ............................... | 705/8 |
| 5,642,484 | 6/1997 | Harrison, III et al. .................. | 705/14 |
| 5,671,331 | 9/1997 | Croley .................................... | 704/270 |
| 5,712,830 | 1/1998 | Ross et al. .............................. | 367/93 |

*Primary Examiner*—Tariq R. Hafiz
*Assistant Examiner*—Jason W. Rhodes

[57] ABSTRACT

An automated teller machine (10) or a home banking system (32) is operated to provide, during the delays associated with authorizing and acting upon a user instruction, a sales presentation related to a financial product. The type of presentation is selected by matching a profile of the user, obtained from a central information store (20), with profiles of target customers for a number of financial products.

16 Claims, 3 Drawing Sheets

SELF-SERVICE SYSTEM

BACKGROUND OF THE INVENTION

This invention relates to a financial self service system having terminals such as automated teller machines (ATMs) which permit withdrawal of cash, balance inquiry etc. or home banking terminals by which financial transactions and inquiries can be initiated from a user's home or office.

During the operation of an ATM or home banking terminal there are short intervals of time during which the machine is, for example, checking that a PIN (Personal Identification Number) just entered by a user is acceptable, or that the account holder requesting a cash withdrawal or transfer has sufficient funds to cover the amount, or (in the case of an ATM) is counting notes for presentation to the user. During these intervals, which in this specification will be referred to as opportunity intervals, it is known for an ATM to display a short message such as "please wait while your transaction is processed".

In European Patent Application No. 0 645 744 there is disclosed by the present applicant an ATM which operates in a predictive manner, in that when a user enters their card, the machine identifies the user, predicts the transaction most likely to be requested by that user, and presents one or more relevant messages, such as "Do you require £20?" or "Do you require a mini statement?", in accordance with that user's habitual transaction request or requests.

SUMMARY OF THE INVENTION

It is an object of the invention to provide a self-service device having improved facilities during opportunity intervals as hereinbefore defined.

According to the invention there is provided a method of operating a financial self-service system comprising the steps of:

receiving a request for a financial transaction initiated from a self-service terminal by a user;

authorizing said request;

and acting upon said request;

characterized by extracting a profile of said user from central user information storage means;

searching for a match between said profile of said user and a target customer profile stored in financial product profile storage means; and if such a match is found, presenting to the user on said self-service terminal a sales presentation related to said financial product during at least one opportunity interval while authorizing and acting upon said request.

BRIEF DESCRIPTION OF THE DRAWINGS

The invention will now be described by way of example, only with reference to the accompanying drawings in which:

FIG. 3 illustrates discrimination between a queue of potential users and passers by.

DETAILED DESCRIPTION

Figure 1:
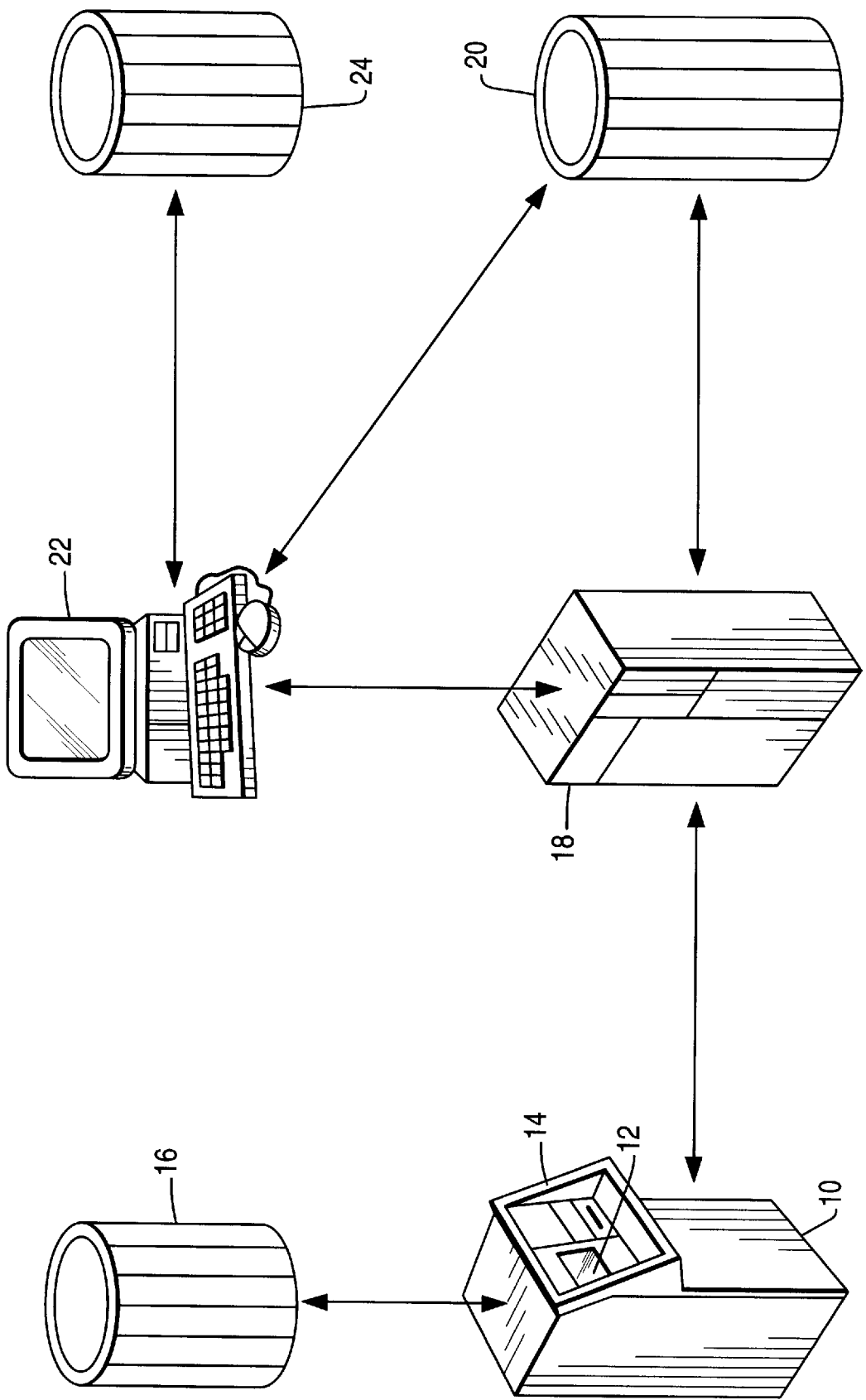
FIG. 1 illustrates an ATM system according to the invention.

In FIG. 1 an ATM 10 has a conventional display screen 12 and input means 14, such as a key pad and/or touch screen. The ATM 10 is connected to a sales presentation storage means, indicated schematically at 16, capable of storing video/graphics information, such as a compact disc. As is well known, the ATM is connected to a central host computer system 18 running a customer information file 20. A product profile storage means 24 in the form of a database system is connected to a relationship management system 22, which is connected to both the customer information file 20 and the host computer system 18.

The sales presentation storage means contains static or moving visual displays, or audio-visual displays relating to a number of financial products or services available from the system operator, arranged in relatively short sections suitable for presentation during opportunity intervals as hereinbefore defined.

The product profile storage means 24 contains information which provides a profile of each type of sales presentation stored in the sales presentation storage means 16, and of the profiles of customers likely to be interested in the related financial product or financial service (hereinafter referred to as "a product". The relationship management system 22 is alerted by the host system 18 to a sales opportunity, i.e. a card inserted in the ATM 10 with a conventional transaction instruction, and requests from the customer information file 20 the details of that cardholder; the management system 22 then attempts to match the customer's profile to one or more product profiles, for example while the ATM is awaiting authorization of the transaction by the host system, and passes an instruction through the host system 18 to the ATM 10, allowing it to utilize the sales presentation storage means 16 in order to provide the appropriate display during one or more opportunity intervals of the ATM transaction.

The profiles of the products and of users may be based on information such as account profiles and demographic information, allowing a best match between the product displayed and the user, to give the highest possibility of making a sale. The match may be based on a record of actual sales of the product to other customers with similar account/ demographic profiles, or on a theoretically-determined match, which would be especially useful for early sales of a product. The match will be made while a user is keying in a PIN, and selecting a required transaction.

The relationship management system 22 uses known techniques of database mining or expert systems or artificial intelligence to identify areas of commonality between a user and a product.

In the simplest implementation of the invention, a user inserts a card and PIN into the input means 14 and selects a required transaction; the ATM is arranged to provide a message on the display screen 12 indicating that the transaction is being processed, and also calls up from the sales presentation storage means 16 an initial "hook" screen, which provides brief details of a product or service that the financial institution controlling the ATM 10 wishes to sell. The product may be the most recently announced, or most profitable, or popular, product. The presentation will usually be provided while the ATM is counting cash or printing a statement.

In a variation, a user is given the option, by pressing the appropriate key on the input means 14, of asking for more information about the product, either by a further display on the display means 12, or on paper sent by post to the user's home. In the latter case, the user's address may be displayed for confirmation or correction by the user by appropriate key entry. All such interactions are under the control of the ATM's processor.

An example of more information to be provided would be if a loan application had been advertised and a user indicated interest in it; the repayment schedules on various loan amounts repayable over various time periods could be displayed.

The duration of the opportunity for a display during a conventional ATM transaction is not great, and complex products may require a substantial time to explain to a user. However, there may be a queue waiting to use the ATM, in which case it is highly preferable if short displays are selected from the sales presentation storage means 16.

The simplest indication of a queue is the rate of insertion of user cards; in a variation of the system the processor of the ATM 10 is programmed to detect the intervals between card insertions; if the intervals indicate insertion of another card immediately after a transaction is completed, then either short displays will be selected, or no display will be given.

In some transactions, a user inserts the same card twice; for example, if cash is withdrawn, the user may reinsert his or her card to request an up-to-the minute balance figure which takes account of the withdrawal. The ATM processor will also be programmed to sense that the previous card has been presented again, thus overriding the timing information, and also preventing a re-run of a previous sales presentation to the same user.

If a substantial interval occurs between card insertions, it can be inferred that there is no queue and the processor will then permit a display, or a display of a longer duration, to the next user.

Figure 2:
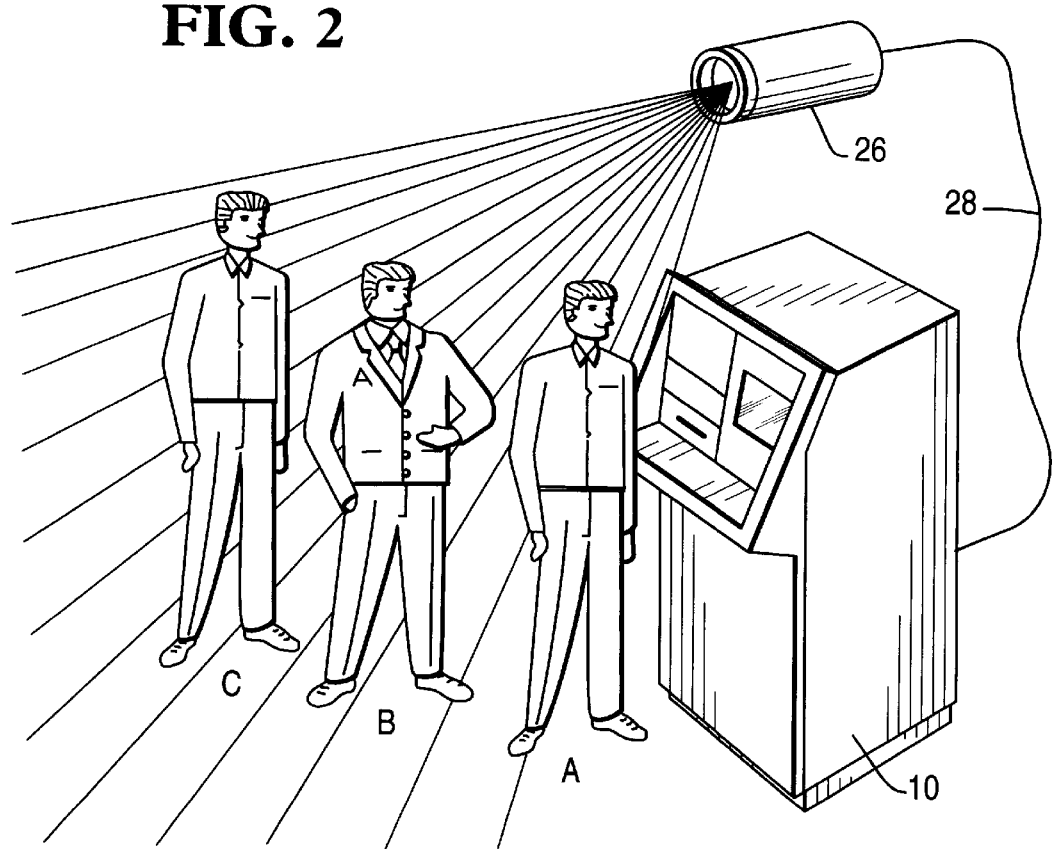
FIG. 2 illustrates an arrangement for sensing the length of a queue at an ATM.

An alternative queue sensing arrangement is shown in FIG. 2. Adjacent to ATM 10, which is connected as illustrated in FIG. 1, there is a thermal imaging sensor 26 arranged to sense the presence of a queue of people A, B, C. The sensor 26 is connected to the ATM 10 by a secure wire 28, and provides signals indicating the presence or absence of a queue so that the processor of the ATM 10 can arrange for a long or a short sales presentation on the display means or no presentation, as appropriate.

Figure 3:
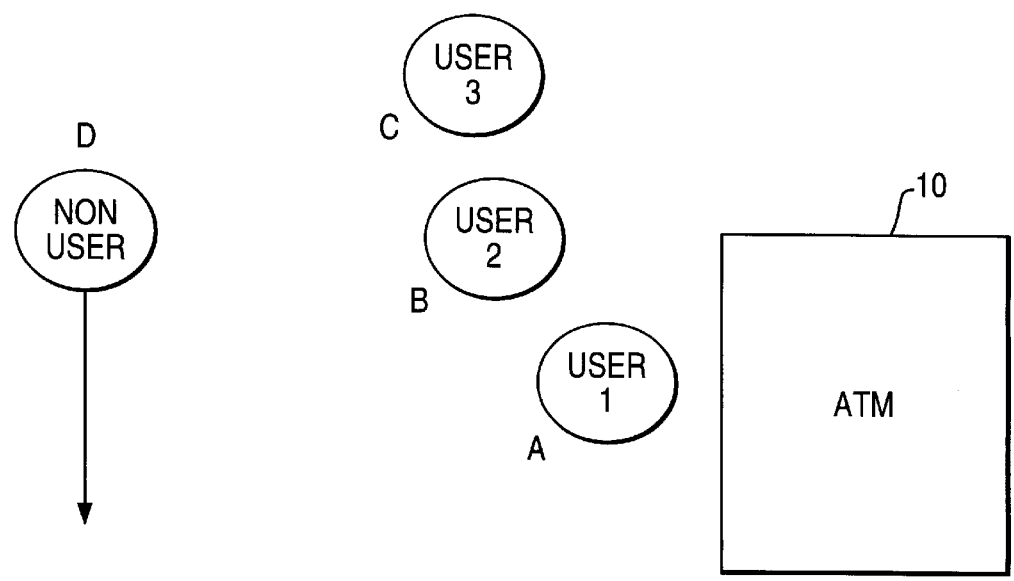

The thermal sensor 26 is arranged to sense the body heat of the people A, B, C and, as illustrated in FIG. 3, is arranged to differentiate between the body heat of the static people A, B, C in the queue and the moving body heat of a passer-by D. Such differentiation is achieved by the comparison of detected heat signatures with stored heat signatures, by known techniques.

It is an advantage of the use of a thermal sensor 26 that it can operate after dark as well as in daylight.

Alternatives to a thermal sensor are sensors utilizing radiation at visible wave lengths, scanning ultrasound, or low power radar; in each case the radiation reflected by a person in a queue, or by a passer-by, is sensed.

If no queue is sensed by sensor 26 at the start of a sales presentation, or if there has been a substantial delay since a previous card insertion, the system is arranged to permit an extensive presentation; if however the sensor 26 senses a queue build-up during the presentation, the system is arranged to bring the presentation to an early, but acceptable, conclusion.

Wherever a sales presentation is given, the system may be arranged to provide a final display screen in summary form, and to give the user the option of an immediate print-out of that screen, or of providing it by post. These options are presented by touch-screen or other keys on the input 14.

If there are two or more ATMs at a single site, the queue sensing means 26 will be programmed accordingly, or a second sensor etc. will be provided.

In all arrangements, the user will be provided with an option, selectable by key pad or touch screen, to terminate a sales presentation at any time.

In all variations, the ATM with adaptive sales presentation facilities according to the invention will be arranged to balance a high rate of transaction throughput against the opportunity of sales presentation displays.

Figure 4:
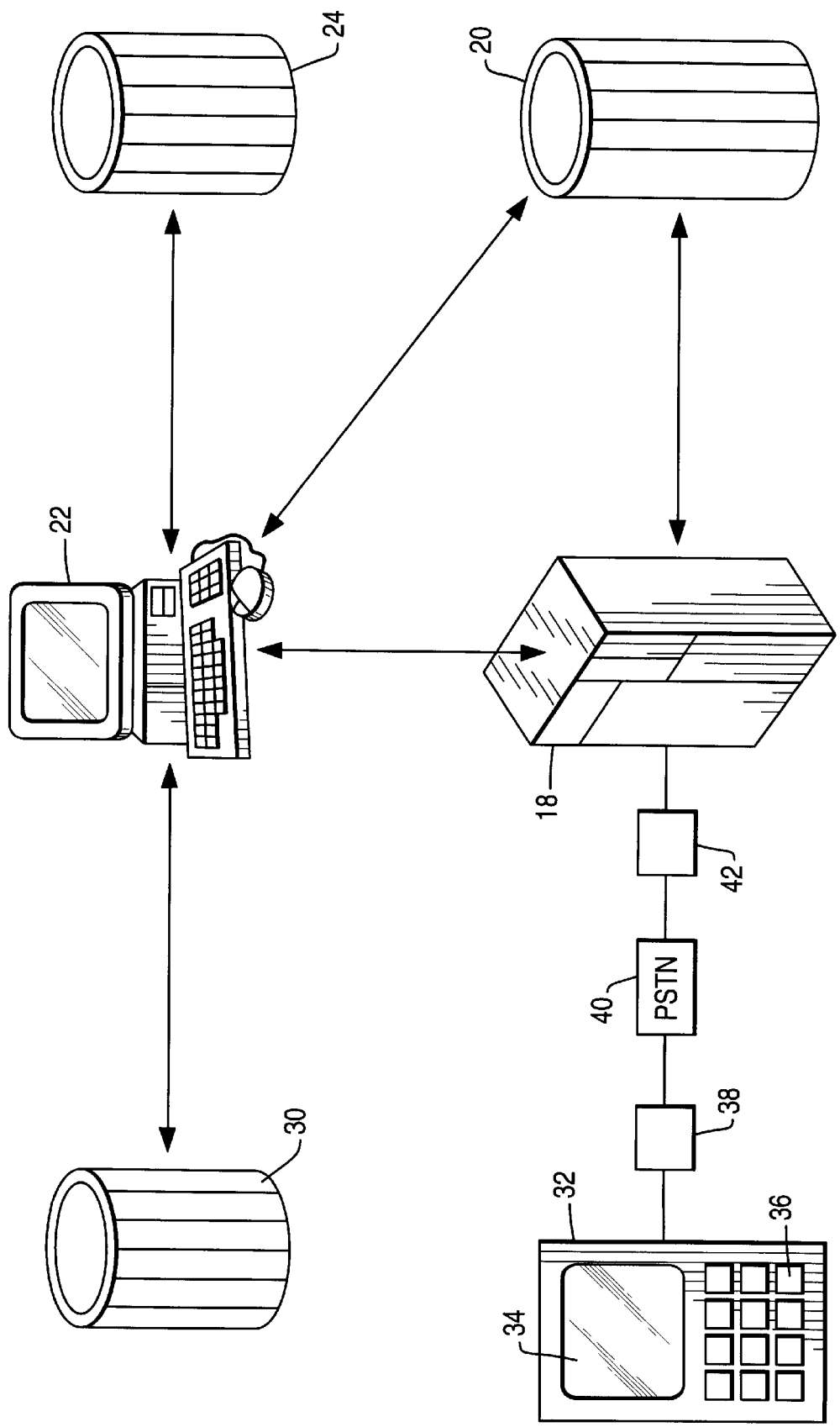
FIG. 4 illustrates a home banking system according to the invention.

FIG. 4 shows an embodiment of the invention in a home banking system. The host computer system 18, customer information file 20, relationship management system 22 and product profile storage system 24 are arranged as in FIG. 1.

A sales presentation storage means 30 is now provided centrally (as of course it could be in a small variation of the FIG. 1 embodiment) and is connected to the relationship management system 22, or alternatively to the host computer system 18.

The user terminal comprises a home banking terminal 32 having a display screen 34 and an input means 36 such as a keyboard. The terminal may be based on a personal computer, or on a terminal as described in the applicant's copending UK patent application No. 9610645.5 filed on May 21, 1996.

The terminal 32 is connected through a modem 38 to the PSTN (public switched telephone network) 40 to a further modem 42 connected to the host computer system 18.

The matching of a user profile with a product profile is carried out in the same way as in the FIG. 1 embodiment, and the relationship management system 22 calls up the selected sales presentation from storage means 30 and routes it through the host system 18, modem 42, PSTN 40, and modem 38 to the home banking terminal 32.

In the more relaxed environment of a terminal used in the home or office, it may be possible to display longer sales presentations. However, the user of the home banking terminal will always be presented with the option of terminating a display.

What is claimed is:

1. An unattended self-service terminal connectable to a host system and for allowing a self-service customer to carry out a self-service transaction, the self-service terminal comprising:

input means for receiving customer identifying information from the self-service customer;

display means for displaying sales information to be viewed by the self-service customer;

storage means for storing a plurality of sales presentations which are viewable by the self-service customer;

queue sensing means for sensing a queue of potential self-service customers adjacent to the self-service terminal and providing a signal indicative thereof; and control means for selecting one of the plurality of sales presentations based upon the customer identifying information received from the self-service customer and the signal from the queue sensing means to display the selected sales presentation on the display means to provide sales information to be viewed by the self-service customer.

2. An unattended self-service terminal according to claim 1, wherein the queue sensing means includes means for detecting radiation reflected by a human being adjacent to the self-service terminal.

3. An unattended self-service terminal according to claim 1, wherein the queue sensing means includes means for detecting infrared radiation emitted by a human being adjacent to the self-service terminal.

4. An unattended self-service terminal according to claim 1, wherein the queue sensing means includes means for distinguishing between stationary humans and passers-by relative to the self-service terminal.

5. An automated teller machine (ATM) connectable to a host system and for allowing an ATM customer to carry out a self-service financial transaction, the ATM comprising:

a currency dispenser for dispensing currency to the ATM customer in response to the ATM customer requesting that currency be dispensed during the self-service financial transaction;

an input device for receiving a customer identifying card from the ATM customer to verify identity of the ATM customer;

a display for displaying sales information to be viewed by the ATM customer;

a storage unit for storing a plurality of sales presentations which are viewable by the ATM customer;

a queue sensing unit for sensing a queue of potential ATM customers adjacent to the ATM and providing a signal indicative thereof; and a controller for (i) selecting one of the plurality of sales presentations based upon identity of the ATM customer and the signal from the queue sensing unit, (ii) controlling operation of the currency dispenser to dispense currency to the ATM customer after identity of the ATM customer has been verified and the ATM customer has requested that currency be dispensed from the currency dispenser, and (iii) controlling the display to display the selected sales presentation to provide sales information to be viewed by the ATM customer while identity of the ATM customer is being verified.

6. An ATM according to claim 5, wherein the queue sensing unit includes means for detecting radiation reflected by a human being adjacent to the ATM.

7. An ATM according to claim 5, wherein the queue sensing unit includes means for detecting infrared radiation emitted by a human being adjacent to the ATM.

8. An ATM according to claim 5, wherein the queue sensing unit includes means for distinguishing between stationary humans and passers-by relative to the ATM.

9. An automated teller machine (ATM) connectable to a host system and for allowing an ATM customer to carry out a self-service financial transaction, the ATM comprising:

a currency dispenser for dispensing currency to the ATM customer in response to the ATM customer requesting that currency be dispensed during the self-service financial transaction;

an input device for receiving a customer identifying card from the ATM customer to verify identity of the ATM customer;

a display for displaying sales information to be viewed by the ATM customer;

a storage unit for storing a plurality of sales presentations which are viewable by the ATM customer;

a queue sensing unit for sensing a queue of potential ATM customers adjacent to the ATM and providing a signal indicative thereof; and a controller for (i) selecting one of the plurality of sales presentations based upon identity of the ATM customer and the signal from the queue sensing unit, (ii) controlling operation of the currency dispenser to dispense currency to the ATM customer after identity of the ATM customer has been verified and the ATM customer has requested that currency be dispensed from the currency dispenser, and (iii) controlling the display to display the selected sales presentation to provide sales information to be viewed by the ATM customer while the currency dispenser is counting currency to be dispensed to the ATM customer during the self-service financial transaction.

10. An ATM according to claim 9, wherein the queue sensing unit includes means for detecting radiation reflected by a human being adjacent to the ATM.

11. An ATM according to claim 9, wherein the queue sensing unit includes means for detecting infrared radiation emitted by a human being adjacent to the ATM.

12. An ATM according to claim 9, wherein the queue sensing unit includes means for distinguishing between stationary humans and passers-by relative to the ATM.

13. An automated teller machine (ATM) connectable to a host system and for allowing an ATM customer to carry out a self-service financial transaction, the ATM comprising:

a receipt printer for printing a receipt containing information relating to the self-service financial transaction to be delivered to the ATM customer after the self-service financial transaction has been carried out;

an input device for receiving a customer identifying card from the ATM customer to verify identity of the ATM customer;

a display for displaying sales information to be viewed by the ATM customer;

a storage unit for storing a plurality of sales presentations which are viewable by the ATM customer;

a queue sensing unit for sensing a queue of potential ATM customers adjacent to the ATM and providing a signal indicative thereof; and a controller for (i) selecting one of the plurality of sales presentations based upon identity of the ATM customer and the signal from the queue sensing unit, (ii) controlling operation of the receipt printer to print a receipt to be delivered to the ATM customer after the self-service financial transaction has been carried out, and (iii) controlling the display to display the selected sales presentation to provide sales information to be viewed by the ATM customer while the receipt printer is printing the receipt to be delivered to the ATM customer.

14. An ATM according to claim 13, wherein the queue sensing unit includes means for detecting radiation reflected by a human being adjacent to the ATM.

15. An ATM according to claim 13, wherein the queue sensing unit includes means for detecting infrared radiation emitted by a human being adjacent to the ATM.

16. An ATM according to claim 13, wherein the queue sensing unit includes means for distinguishing between stationary humans and passers-by relative to the ATM.

* * * * *